United States Patent
Yi et al.

(10) Patent No.: US 8,322,022 B1
(45) Date of Patent: Dec. 4, 2012

(54) METHOD FOR PROVIDING AN ENERGY ASSISTED MAGNETIC RECORDING HEAD IN A WAFER PACKAGING CONFIGURATION

(75) Inventors: Ge Yi, San Ramon, CA (US); Hongxing Yuan, San Ramon, CA (US); Ming Sun, Fremont, CA (US); Dujiang Wan, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 208 days.

(21) Appl. No.: 12/825,098

(22) Filed: Jun. 28, 2010

(51) Int. Cl.
 *G11B 5/127* (2006.01)
 *H04R 31/00* (2006.01)

(52) U.S. Cl. ............. 29/603.14; 29/603.13; 29/611; 360/121; 360/122; 360/317; 360/320; 360/324; 369/13.13; 369/13.14; 369/13.35

(58) Field of Classification Search .. 29/603.12–603.16, 29/603.18; 219/209; 360/121, 122, 245.3, 360/317, 324
See application file for complete search history.

(56) References Cited

U.S. PATENT DOCUMENTS

| | | | |
|---|---|---|---|
| 4,939,101 A | 7/1990 | Black | |
| 6,008,113 A | 12/1999 | Ismail | |
| 6,504,253 B2 | 1/2003 | Mastromatteo | |
| 7,005,319 B1 | 2/2006 | Chen | |
| 7,203,387 B2 | 4/2007 | Doan | |
| 7,332,411 B2 | 2/2008 | McKinnell | |
| 7,349,614 B2 | 3/2008 | Doan | |
| 7,459,025 B2 | 12/2008 | Lee | |
| 7,465,592 B2 | 12/2008 | Yoo | |
| 7,562,686 B2 | 7/2009 | Best | |
| 7,924,658 B2 * | 4/2011 | Shimazawa et al. | 369/13.14 |
| 8,012,804 B1 * | 9/2011 | Wang et al. | 438/110 |
| 8,134,794 B1 * | 3/2012 | Wang | 360/59 |
| 2006/0110851 A1 | 5/2006 | Burrell | |
| 2007/0181962 A1 | 8/2007 | Partridge | |
| 2007/0295456 A1 | 12/2007 | Gudeman | |
| 2008/0007876 A1 | 1/2008 | Lille | |
| 2008/0073741 A1 | 3/2008 | Apanius | |
| 2008/0124895 A1 | 5/2008 | Lo | |
| 2008/0136955 A1 | 6/2008 | Kathman | |
| 2009/0130821 A1 | 5/2009 | Cox | |
| 2009/0310459 A1 | 12/2009 | Gage | |

* cited by examiner

*Primary Examiner* — Paul D Kim (57) ABSTRACT

A method for providing energy assisted magnetic recording (EAMR) heads is described. The method comprises bonding a plurality of lasers to a first substrate. The plurality of lasers corresponds to the plurality of EAMR heads and is for providing energy to a plurality of EAMR transducers. The method further comprises fabricating the plurality of EAMR transducers for the plurality of EAMR heads on a second substrate, bonding the first substrate to the second substrate such that the plurality of EAMR transducers and the plurality of lasers reside between the first substrate and the second substrate, removing at least one of the first substrate and the second substrate, and separating a remaining substrate into the plurality of EAMR heads.

15 Claims, 10 Drawing Sheets

METHOD FOR PROVIDING AN ENERGY ASSISTED MAGNETIC RECORDING HEAD IN A WAFER PACKAGING CONFIGURATION

BACKGROUND

Figure 1:
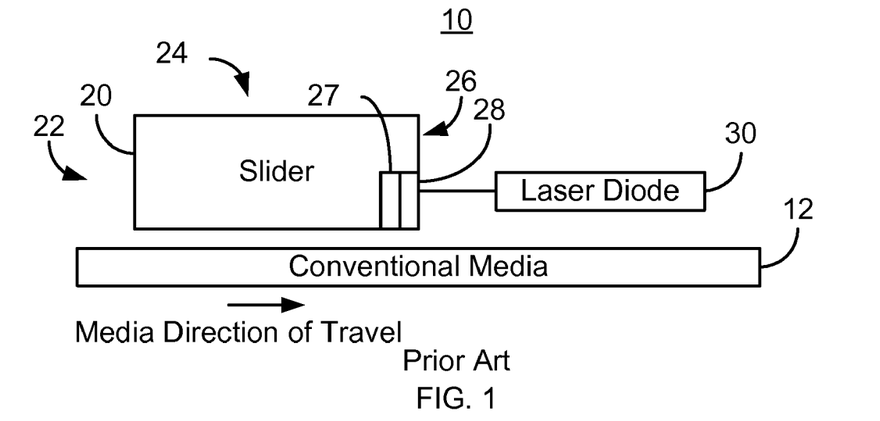
FIG. 1 is a diagram depicting a portion of a conventional energy assisted magnetic recording disk drive.

FIG. 1 depicts a side view of portion of a conventional energy assisted magnetic recording (EAMR) disk drive 10. The conventional EAMR disk drive 10 includes a recording media 12, a conventional slider 20, and a conventional laser diode 30 that are typically attached to a suspension (not shown). The conventional slider 20 has a leading edge 22, a trailing edge 26, and a back side 24. The leading edge 22 and trailing edge 26 are so termed because of the direction the conventional media 12 travels with respect to the EAMR transducer 28. In addition to the conventional EAMR transducer 28, the slider also includes a conventional read transducer 27. Other components that may be part of the conventional EAMR disk drive 10 are not shown. The conventional slider 20 is typically attached to the suspension at its back side 24. A conventional EAMR transducer 28 is coupled with the slider 20.

The laser diode 30 is coupled in proximity to the EAMR transducer 28 on the trailing edge 26 of the slider 20. Although not explicitly shown, the laser diode 30 may be mounted on the trailing edge 26 of the slider 20. Light from the conventional laser diode 30 is provided to the trailing edge 26 of the slider 20. More specifically, light from the laser diode 30 is provided to a grating (not shown) of conventional EAMR transducer 28. The light from the laser diode 30 coupled into the grating is then provided to a waveguide (not shown). The waveguide directs the light toward the conventional media 12, heating a small region of the conventional media 12. The conventional EAMR transducer 28 magnetically writes to the conventional media 12 in the region the conventional media 12 is heated.

Figure 2:
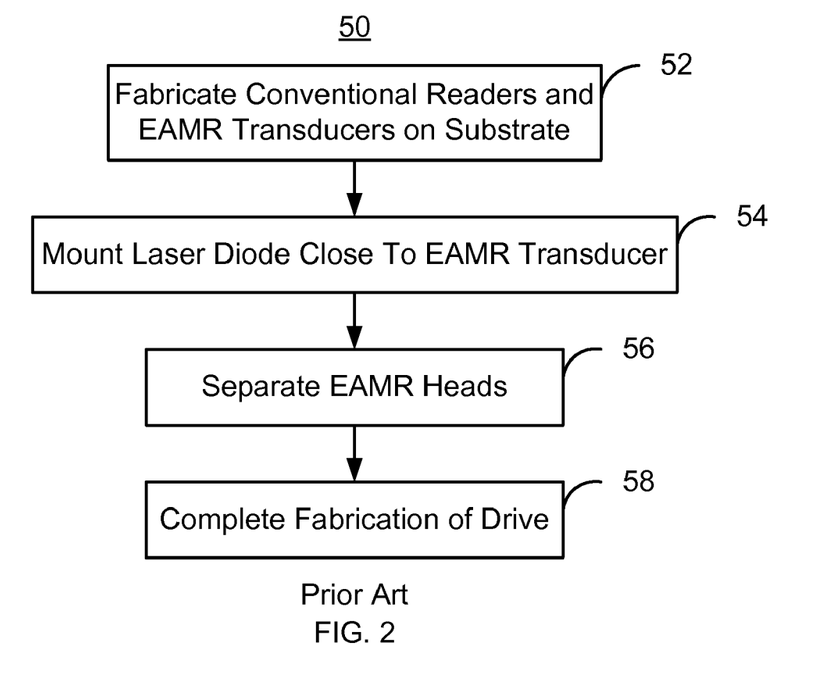
FIG. 2 is a flow chart depicting a conventional method for fabricating a conventional EAMR disk drive.

FIG. 2 depicts a conventional method 50 for fabricating a portion of the conventional EAMR disk drive 10. For simplicity, only a portion of the method 50 is described. The conventional read transducer and EAMR transducer 28 are fabricated on the front side of a conventional substrate, such as an AlTiC substrate, via step 52. Typically, the read transducer for the conventional disk drive 10 is fabricated first, closer to the AlTiC substrate. Thus, the conventional EAMR transducer 28 is built on other structures including the read transducer. Typically, multiple transducers are fabricated in parallel on the same substrate. The substrate later becomes the slider 20.

Figure 3:
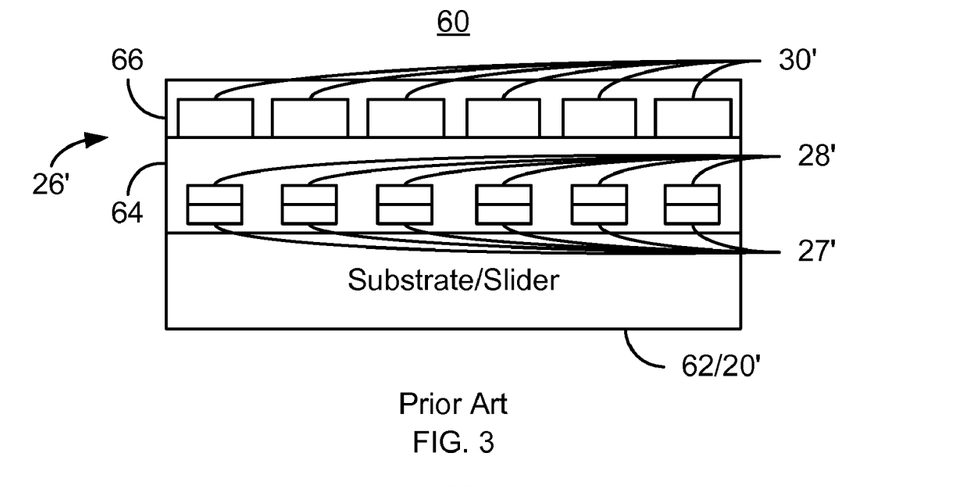
FIG. 3 is a diagram depicting conventional energy assisted magnetic recording heads during fabrication.

Once fabrication of the conventional EAMR transducer 28 is completed, the laser diode 30 may be mounted in proximity to the conventional EAMR transducer 28, via step 54. More specifically, the laser diode 30 is mounted in proximity to the trailing edge 26 of the slider 20. The laser diode 30 may actually be mounted to the trailing edge 26 of the slider 20. For example, FIG. 3 depicts the conventional EAMR heads being fabricated. A substrate 62 is used. When diced at the end of fabrication, the substrate 62 corresponds to the slider 20. Read transducers 27' and EAMR transducers 28' have been fabricated on the front face of the substrate 62 in a device layer 64. The conventional laser diodes 30' have been bonded to the top surface 26' of the devices. This top surface 26' corresponds to the trailing surface 26 once the substrate 62/20' has been diced into the individual EAMR heads. The lasers 30' may be formed in a semiconductor substrate 66. Thus, the lasers 30' may be semiconductor laser diodes.

Referring back to FIG. 3, the EAMR heads may then be separated, via step 56. For example, the substrate 62/20' holding the read transducers 27' and the EAMR transducers 28' may be cleaved or otherwise cut into individual sliders 20. The front side of the substrate, on which the read transducer 27' and EAMR transducer 28' are fabricated, becomes the trailing edge 26 of the slider 20. The EAMR heads might also be separated prior to the laser diode 30 being mounted. However, in both cases, the laser diode is mounted in proximity to the EAMR transducer 28 and, therefore, in proximity to the trailing edge 26. The fabrication of the conventional drive 10 may then be completed, via step 58. For example, the conventional EAMR head including the conventional slider 20 and conventional EAMR transducer 28 may be mounted on a flexure and then in a disk drive.

Although the conventional EAMR disk drive 10 and method 50 may function, improvements are desired. For example, the conventional laser diode 30/30' is a significant heat source during operation. In order for the conventional EAMR transducer 28 to function as desired, this heat is to be dissipated. However, many components of the transducers 27/27' and 28/28' are thermally insulating. Further, the components of the conventional disk drive 10 itself are relatively small. Consequently, heat dissipation may be problematic. In addition, the EAMR disk drive 10 is desired to be used at higher densities. Consequently, there is a drive to smaller sizes and thinner track widths. Fabrication of the components of the transducers 27/27' and 28/28' is increasingly challenging at smaller sizes.

Accordingly, what is needed are improved methods and systems for fabricating EAMR disk drives.

BRIEF SUMMARY OF THE INVENTION

A method and system for providing energy assisted magnetic recording (EAMR) heads are described. A plurality of lasers are bonded to a first substrate. The lasers correspond to the EAMR heads and provide energy to a plurality of EAMR transducers. The EAMR transducers for the plurality of EAMR heads are fabricated on a second substrate. The first substrate is bonded to the second substrate such that the EAMR transducers and the lasers reside between the first substrate and the second substrate. At least one of the first substrate and the second substrate is removed. The remaining substrate is separated into the EAMR heads.

DETAILED DESCRIPTION OF EMBODIMENTS OF THE INVENTION

Figure 4:
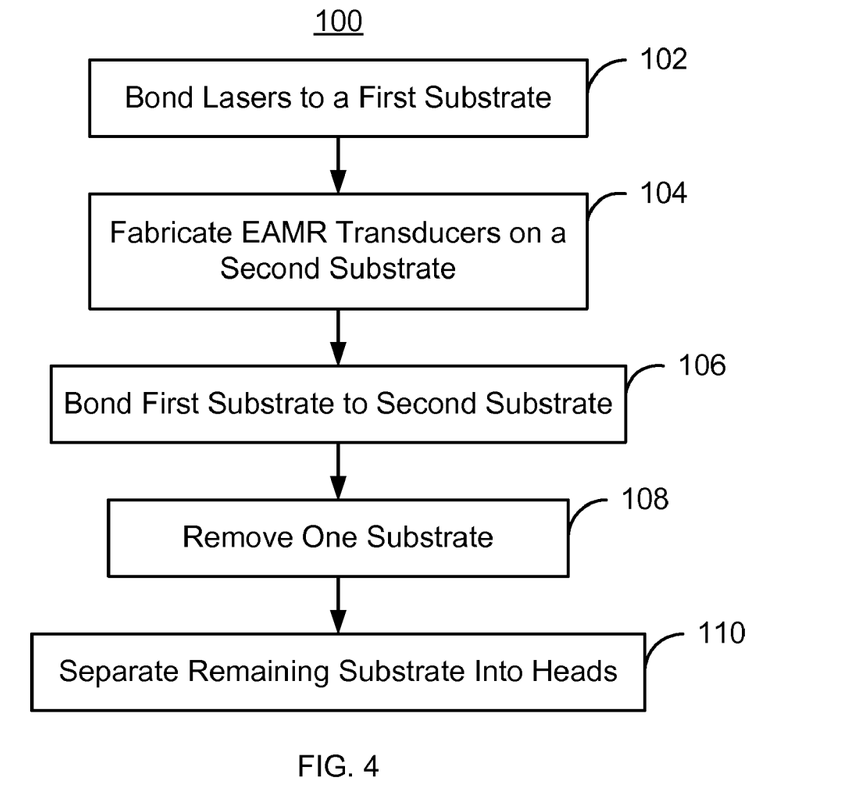
FIG. 4 is a flow chart depicting an exemplary embodiment of a method for fabricating an EAMR head.

FIG. 4 is a flow chart depicting an exemplary embodiment of a method 100 for fabricating EAMR heads. Although certain steps are shown, some steps may be omitted, interleaved, performed in another order, and/or combined. In addition one or more of the steps may include substeps. The EAMR heads being fabricated may be part of merged heads, each of which includes an EAMR write transducer, a read transducer and resides on a slider.

A plurality of lasers are bonded to a first substrate, via step 102. In some embodiments, step 102 is accomplished by wafer bonding a semiconductor substrate, such as GaAs, to the first substrate. Multiple lasers have been fabricated on the semiconductor substrate. Alternatively, a semiconductor substrate may be cleaved into bars. These bars, each of which includes multiple lasers, may be wafer bonded to the first substrate. Thus, the lasers need not be individually bonded to the first substrate. In other embodiments, the lasers might not be formed from a semiconductor. Instead, another material may be used. In addition, the substrate on which the lasers are fabricated may also be thinned after wafer bonding to the first substrate. The first substrate may be an AlTiC substrate. In other embodiments, another substrate may be used. In general, the first substrate is desired to have a higher thermal conductivity. Thus, the first substrate may be used to manage the heat output of the laser. The lasers correspond to the EAMR heads being fabricated and are to be used to provide energy to the EAMR transducers. In one embodiment, one laser is provided for each EAMR head. However, in another embodiment, a different number of lasers may correspond to each EAMR head.

The EAMR transducers for the EAMR heads are fabricated on a second substrate, via step 104. Step 104 may also include fabricating read transducers on the same substrate. The EAMR transducers and read transducers may be formed in a device layer on the second substrate. For example, a sacrificial layer may be formed on the second substrate. The device layer may then be formed on the second substrate. The EAMR transducers fabricated in step 104 is formed in this device layer. In some embodiments, the read transducers may be fabricated closer to the second substrate than the EAMR transducers. Thus, the fabrication of the read and EAMR transducers may be performed in a traditional manner. In other embodiments, the EAMR transducers are fabricated closer to the second substrate than the read transducers. In such embodiments, the EAMR transducer is fabricated prior to the read transducer.

Formation of each of the EAMR transducers in step 104 may include forming a main pole, a near-field transducer (NFT), a waveguide, shields, coils, and other structures in each transducer. Energy from the laser may be coupled into the waveguide by one or more gratings. The waveguide directs the energy from the laser to the NFT. The NFT focuses the energy from the laser onto a media. The main pole includes high saturation magnetization material(s) and writes to the region of the media heated by the energy. In addition, a liner may be provided on at least the sides of the main pole. In some embodiments, the liner may be provided on the top of the main pole. In some embodiments, the liner has a higher thermal conductivity than the thermal conductivity of the pole. For example, the liner may include one or more of Au, Ag, Cu, their alloys, and AlN. In other embodiments, the liner has a lower optical absorption of the energy provided by the laser than the main pole. In still other embodiments, the liner may have both a higher thermal conductivity and a lower optical absorption than the main pole. A soft magnetic layer may also be fabricated between the main pole and the second substrate. Further, NFTs and waveguides may be fabricated before the main poles. Thus, the NFT, waveguides, and main pole may be fabricated in a traditional manner. However, in other embodiments, the NFTs and/or waveguides may be fabricated after the main poles. The NFT may adjoin the main pole or may be separated from the main pole, for example by a thin nonmagnetic layer. The contacts for the EAMR transducer may also be fabricated prior to the EAMR transducers. Similarly, the contacts for the read transducer, if present, may also be fabricated prior to the read and EAMR transducers. Thus, contacts would be available after removal of the second substrate, described below. The second substrate may be an AlTiC substrate. In some embodiments, both the first and second substrates are AlTiC substrates. However, the first and second substrates need not be the same.

The first substrate is bonded to the second substrate, via step 106. The substrates are bonded such that the EAMR transducers and the lasers reside between the first substrate and the second substrate. Step 106 includes aligning the lasers to the appropriate EAMR transducer. This may be performed, for example, using passive alignment techniques. The substrates may then be bonded using wafer bonding techniques. For example, the alignment and bonding may be accomplished using a plug and socket feature fabricated on the first and second substrates.

At least one of the first substrate and the second substrate is removed, via step 108. In general, only the second substrate on which the EAMR transducers are fabricated is removed. Consequently, the exemplary embodiments herein are described in the context of only the second substrate being removed. In embodiments in which the sacrificial layer is provided, the sacrificial layer may protect the EAMR transducers and other structures in the device layer. For example, the sacrificial layer may be an etch stop layer for an etch configured to remove the second substrate. In some embodiments, the second substrate is removed after the first and second substrates are bonded in step 106. In alternate embodiments, the second substrate may be removed before the first and second substrates are bonded.

The remaining substrate is separated into the EAMR heads, via step 110. Thus, the first substrate may be diced, cleaved, or otherwise cut in an appropriate manner. The substrate is diced or otherwise cut such that the components fabricated in step 102 through 108 remain with the corresponding EAMR head. Fabrication of the EAMR heads/disk drives may then be completed. For example, the heads may be lapped and mounted in a disk drive.

Figure 5:
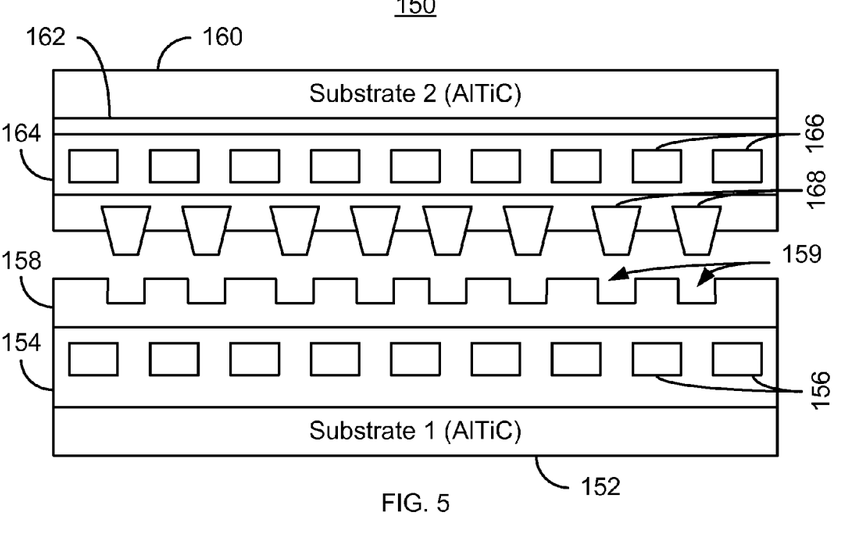
FIG. 5 is a diagram depicting an exemplary embodiment of EAMR heads during fabrication.

For example, FIGS. 5-8 are diagrams depicting EAMR heads 150 during fabrication using the method 100. For clarity, FIGS. 5-8 are not to scale. Further, for simplicity, not all components are labeled in FIGS. 5-8. FIG. 5 depicts EAMR heads 150 being fabricated using the method 100, during step 106, and using plug and socket alignment. A first substrate 152 has been bonded to a laser substrate 154 on which lasers 156 have been formed. For clarity, only two lasers 156 are labeled. The laser substrate 154 may be a semiconductor substrate such as GaAs on which lasers 156 are formed. The laser substrate 154 may also have been thinned. The laser substrate 154 may be an entire wafer or a bar. A socket feature 158 having sockets 159 has been fabricated on the first substrate 152. For clarity, only two sockets 159 are labeled. The second substrate 160 is also shown. An optional sacrificial layer 162 is fabricated on the second substrate. EAMR transducers 166 have been fabricated in a device layer 164. Also shown are plugs 168 that form a plug feature. For clarity, only two plugs 168 are labeled. The first substrate 152 and the second substrate 160, and thus lasers 156 and EAMR transducers 166, are aligned using the plugs 168 and socket feature 159. The plugs 168 are fitted into the sockets 159 and the substrates 152 and 160 bonded.

Figure 6:
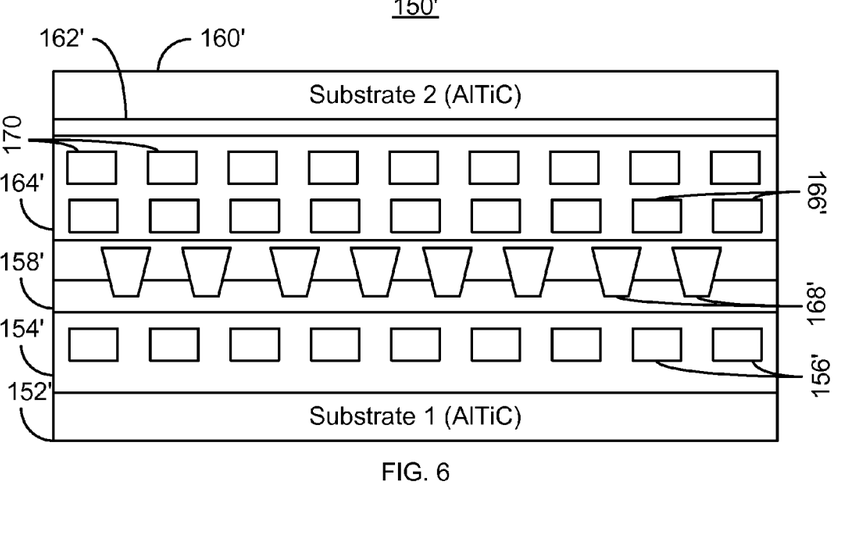
FIG. 6 is a diagram depicting an exemplary embodiment of EAMR heads during fabrication.
Figure 7:
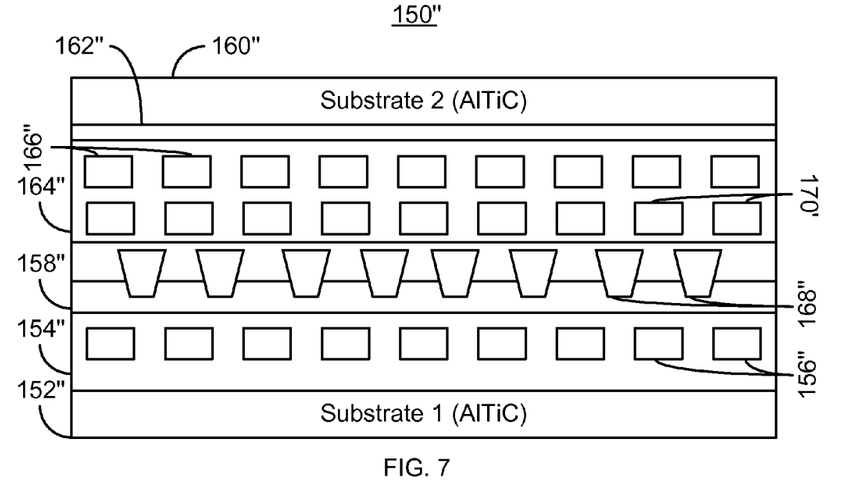
FIGS. 7-8 are diagrams depicting exemplary embodiments of EAMR heads during fabrication.

FIGS. 6-7 depict embodiments of EAMR heads 150' and 150" after step 106 is performed and in which both substrates are still present. The EAMR heads 150 and 150' are analogous to the EAMR heads 150. Consequently, analogous structures have similar labels. The EAMR heads 150' of FIG. 6 include a first substrate 152', a laser substrate 154', lasers 156', socket feature 158', second substrate 160', sacrificial layer 162', EAMR transducers 166' in device layer 164' and plugs 168' that are analogous to the first substrate 152, the laser substrate 154, the lasers 156, the socket feature 158, the second substrate 160, the sacrificial layer 162, the EAMR transducers 166 in device layer 164 and plugs 168, respectively. In addition, read transducers 170 are also shown. In the embodiment shown in FIG. 6, the read transducers 170 are fabricated closer to the second substrate 160' than the EAMR transducers 166'. Thus, the device layer 164' may be fabricated in a traditional manner. In FIG. 7, the EAMR heads 150" include a first substrate 152", a laser substrate 154", lasers 156", socket feature 158", second substrate 160", sacrificial layer 162", EAMR transducers 166" in device layer 164" and plugs 168" that are analogous to the first substrate 152, the laser substrate 154, the lasers 156, the socket feature 158, the second substrate 160, the sacrificial layer 162, the EAMR transducers 166 in device layer 164 and plugs 168, respectively. In addition, read transducers 170' are also shown. In the embodiment shown in FIG. 7, the EAMR transducers 166" are fabricated closer to the second substrate 160' than the read transducers 170'. In both the EAMR heads 150' and 150", the plugs 168' and 168" have been aligned with and fit into the sockets of the socket feature 158' and 158", respectively.

Figure 8:
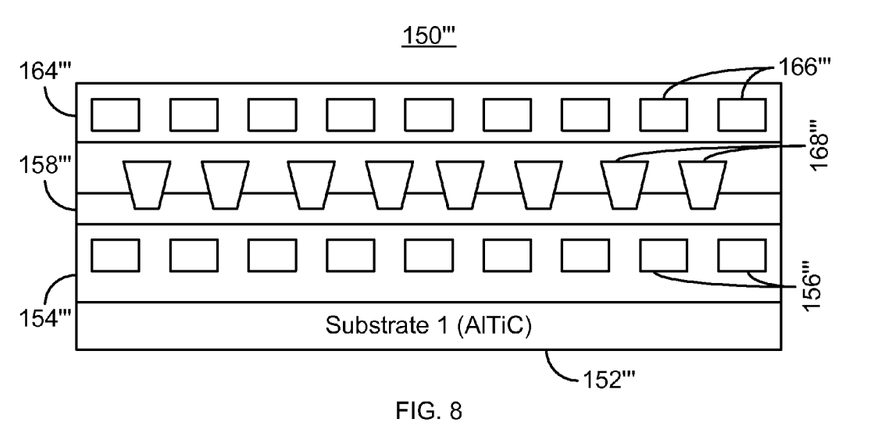

FIG. 8 depicts the EAMR heads 150''' after steps 106 and 108 have been performed. The EAMR heads 150' of FIG. 8 include a first substrate 152''', a laser substrate 154''', lasers 156''', socket feature 158''', EAMR transducers 166''' in device layer 164''' and plugs 168''' that are analogous to the first substrate 152, the laser substrate 154, the lasers 156, the socket feature 158, the EAMR transducers 166 in device layer 164 and plugs 168, respectively. Thus, the second substrate 160 and sacrificial layer 162 have been removed. In addition, for simplicity, no read transducers are shown. In addition, the lasers 156''' have been aligned with the appropriate EAMR transducers 166'''.

Using the method 100, the EAMR heads 150 may be fabricated. The first substrate 152/152'/152"!52''' may be used as the substrate/slider for the heads. As a result, the first substrate 152/152'/152"!52''' may be used to heat sink the laser 156/156'/156"/156'''. Heat generated by the laser 156/156'/156"/156''' may be better dissipated. This improvement in heat dissipation may be provided without introducing additional magnetic structures. Further, use of the high thermal conductivity and/or low optical absorption liner for the main pole also may improve the heat dissipation of the EAMR transducers 166/166'/166"/166'''. For example, the heat dissipation for the NFT and pole may be improved. In addition, providing the EAMR transducers 166/166'/166"/166''' before read transducers 170/170' allows processes which would otherwise adversely affect the performance of the read transducer 170/170' to be used in fabricating the EAMR transducer 166/166'/166"/166'''. In addition, the write pole may be made thinner, which may also improve the efficiency of the EAMR transducer 166/166'/166"/166'''. Thus, fabrication and performance of the EAMR heads 150 may be facilitated.

Figure 9:
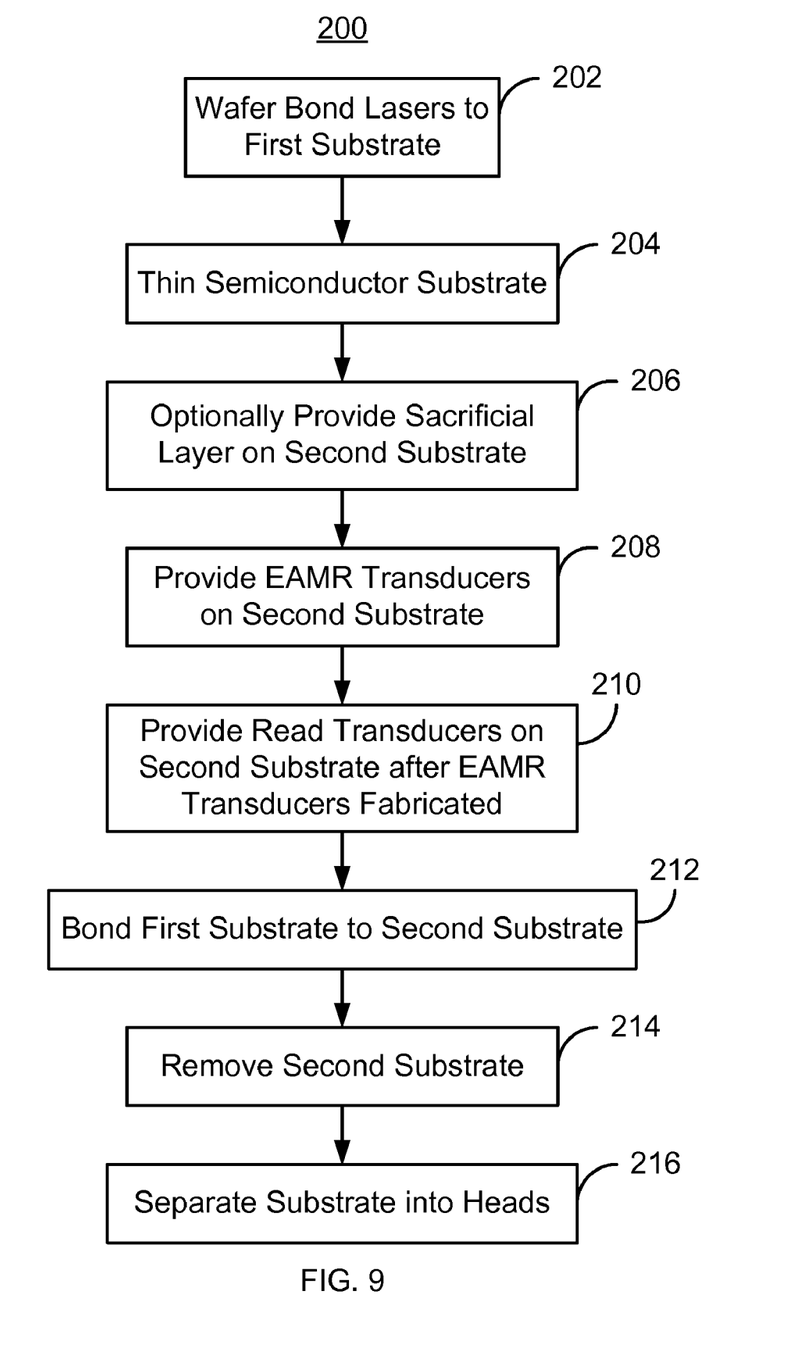
FIG. 9 is a flow chart depicting another exemplary embodiment of a method for fabricating an EAMR head.

FIG. 9 is a flow chart depicting another exemplary embodiment of a method 200 for fabricating an EAMR head. FIGS. 10-14 are diagrams depicting an EAMR head 250 during fabrication. For clarity, FIGS. 10-14 are not to scale. Further, for simplicity, not all components are labeled in FIGS. 9-14. Referring to FIGS. 9-14, the method 200 is described in the context of the substrate, EAMR transducer, and other components shown. However, the method 200 may be used to form other devices (not shown). Although the method 200 is described in the context of a single EAMR head 250 depicted in FIGS. 10-14, multiple heads are typically fabricated in parallel.

A semiconductor substrate, such as GaAs, that includes a plurality of lasers is wafer bonded a first substrate, via step 202. The lasers are thus laser diodes correspond to the EAMR heads being fabricated. The lasers are used for providing energy to the EAMR transducers that are being fabricated. The semiconductor substrate may be a bar of lasers, entire wafer or some other combination of lasers. The first substrate to which the lasers are bonded may be an AlTiC substrate. In other embodiments, another substrate may be used. In general, the first substrate is desired to have a higher thermal conductivity. The lasers correspond to the EAMR heads being fabricated. In one embodiment, one laser is provided for each EAMR head. However, in another embodiment, a different number of lasers may correspond to each EAMR head.

Figure 10:
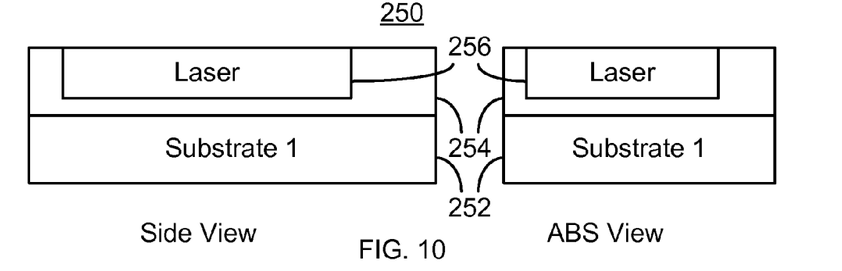
FIGS. 10-14 are diagrams depicting an exemplary embodiment of an EAMR head during fabrication.

The semiconductor substrate is thinned, via step 204. Step 204 may include performing a chemical mechanical planarization (CMP), grinding or otherwise thinning the substrate. FIG. 10 depicts the EAMR heads 250 after step 204 is performed. Thus, a semiconductor substrate 254 in which laser 256 is formed is shown. In addition, the semiconductor substrate 254 has been bonded to the first substrate 252. In A sacrificial layer is optionally provided on a second substrate, via step 206. Step 206 include depositing the sacrificial layer on the second substrate. The sacrificial layer may be a stop layer for the process that removes the second substrate, as described below.

Figure 11:
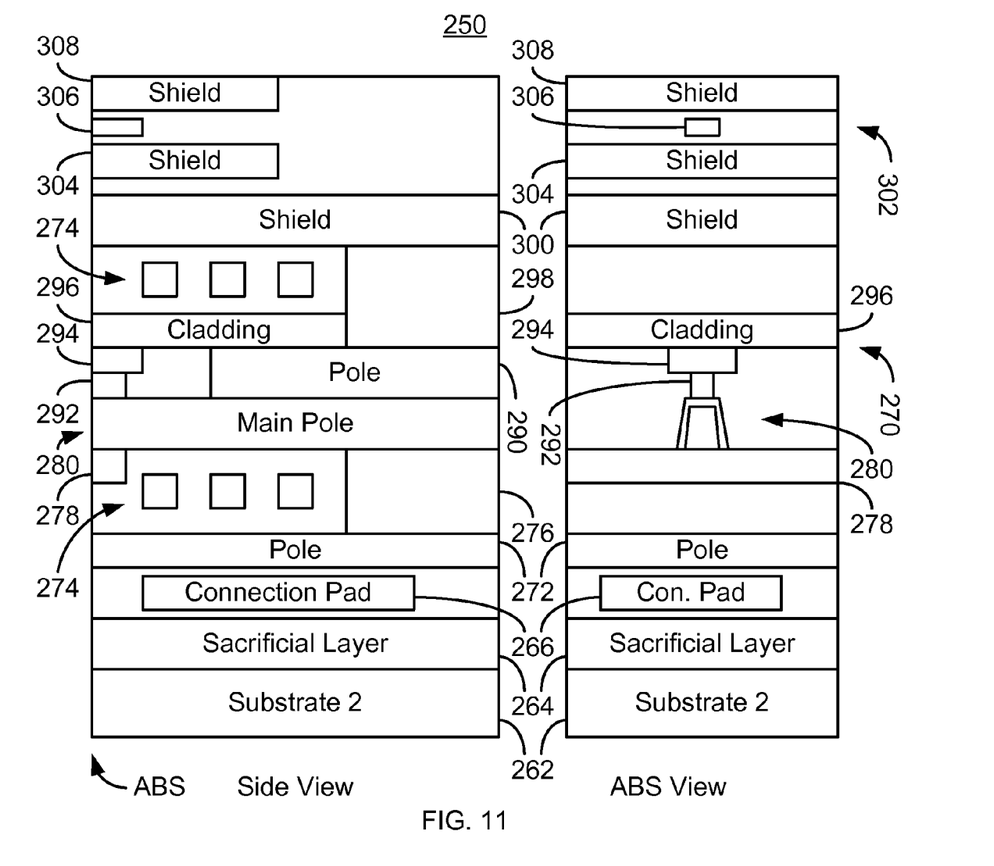

The EAMR transducer and read transducer for the EAMR head 250 are fabricated on the second substrate, via steps 208 and 210, respectively. The sacrificial layer resides between the second substrate and the EAMR transducer. In the embodiments shown, the EAMR transducer is between the read transducer and the second substrate. FIG. 11 depicts a portion of the EAMR head 250 after steps 208 and 210 are performed. A second substrate 262 and sacrificial layer 264 are shown. The EAMR transducer 270 and read transducer 302 reside on the second substrate 262. Also shown are contact pads 266 to which connection can be made after removal of the second substrate 262. The EAMR transducer 270 is fabricated first and resides closer to the second substrate 262 than the read transducer 302. The EAMR transducer 270 includes poles 272 and 290, coil(s) 274, back gaps 276 and 298, optional soft magnetic layer 278, main pole 280, NFT 292, cladding 296 which may be part of a waveguide (not shown in its entirety), and shield 300. The read transducer 302 includes shields 304 and 308 and read sensor 306.

Figure 12:
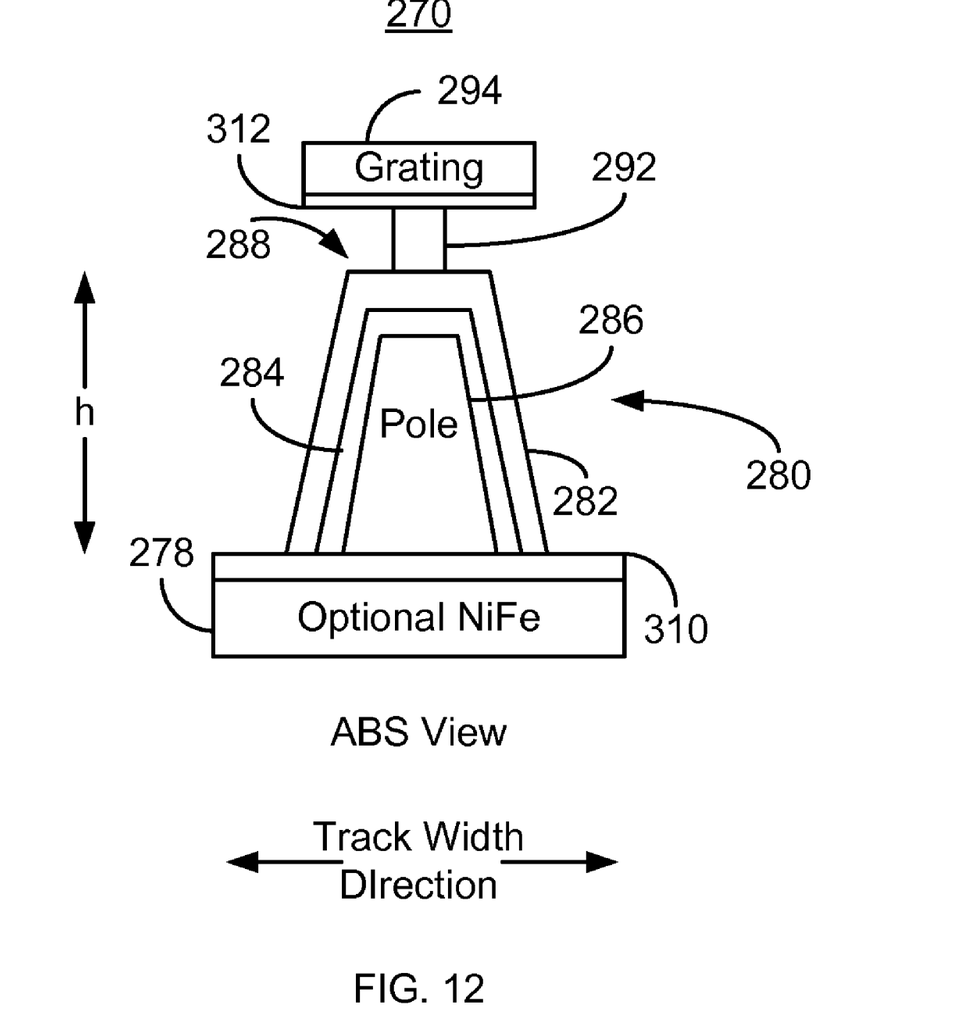

FIG. 12 depicts an ABS view portion of the EAMR transducer 270. In particular, a close up view of the region of the main pole 280 is shown. FIG. 12 depicts the optional soft magnetic layer 278, which may include NiFe. The optional soft magnetic layer 278 may be used to reduce the magnetic field away from the NFT 292. Also shown is a thin nonmagnetic layer 310 that may reside between the optional soft magnetic layer 278 and the pole 280. The pole 280 includes a diffusion inhibition layer 284 and magnetic portion 286. For example, the diffusion inhibition layer may be a Ru layer. The magnetic portion 286 includes high saturation magnetization material(s). In some embodiments, other layers, such as seed layer(s) (not shown), may also be present. The main pole 280 has a bottom, a top that may be thinner than the bottom, and sides. As discussed below, the top of the main pole may be thinner than the bottom because the main pole may be trimmed without damaging the NFT 292. The main pole 280 also has a pole thermal conductivity. In some embodiments, the height, h, is at least two hundred and not more than four hundred nanometers. However, other heights are possible.

The liner 282 adjoins the sides of the main pole 280. In the embodiment shown, the liner 282 also resides between the main pole 280 and the NFT 292. In an alternate embodiment, a portion of the liner 282 may be below the main pole. Although shown as only adjoining the main pole 280, a portion of the liner could reside along the top of the nonmagnetic layer 310. The liner 282 may also extend along the pole to the back gap. Further, various other configurations of the liner 282 may be used. The liner 282 has a liner thermal conductivity greater that is than the pole thermal conductivity of at least the magnetic portion 286 of the main pole 280. For example, the liner 292 may include one or more of Au, Ag, Cu, their alloys, and AlN. Also shown are an NFT 292 and grating 294. A thin nonmagnetic layer 312, such as aluminum oxide, is shown as residing between the NFT 292 and the grating 294. Note that the portion of the NFT 292 shown is a pin. The NFT may have a pin proximate to the ABS and a disk recessed from the ABS. The disk is generally wider than the pin. In some embodiments, the main pole 280 is not wider than the disk of the NFT 100.

The optional NiFe layer 278, nonmagnetic layer 310, pole 280, liner 282, NFT 292, aluminum oxide layer 312 and grating 294, as well as other portions of the EAMR transducer 270 and read transducer 302 are also fabricated in step 208. As discussed above, the NFT 292 may be formed after the main pole 280. In addition, step 208 may include milling the main pole 280 so that the pole 280 is thinner in the track width direction. Further, the milling may result in a main pole 280 in which the top of the main pole that is closer to the NFT 292 is thinner than the bottom of the main pole. Because the main pole 280 is formed prior to the NFT 292 this milling may be performed in step 208 without damaging the NFT 292. Conversely, because the NFT is formed after the main pole 280, the NFT 292 may mask the pole 280 during formation of the NFT 292. Thus, the NFT 292 may be trimmed without damaging the portion of the main pole 280 directly below the NFT 292.

Figure 13:
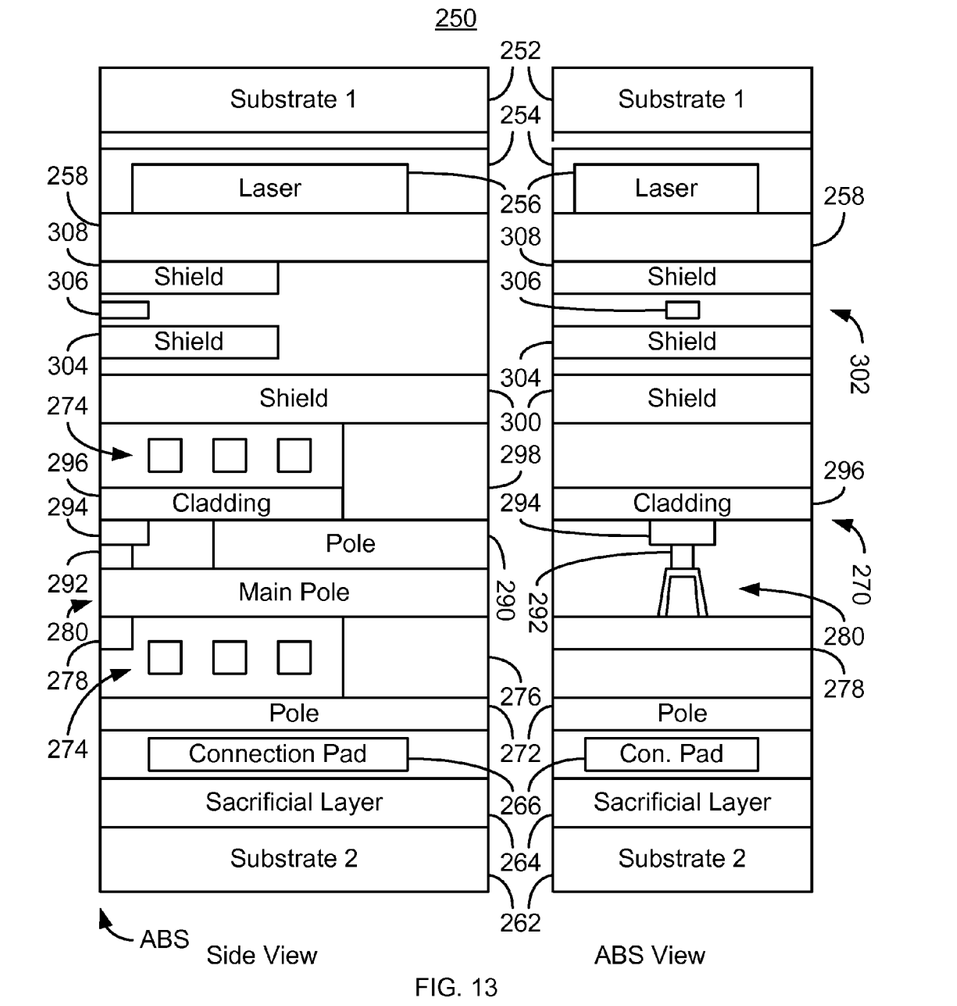

The first substrate 252 is bonded to the second substrate 262 such that the EAMR transducer 270 and the laser 256 are aligned as desired and reside between the substrates 252 and 262, via step 212. The bonding in step 212 may use plug and socket features, described above. Alternatively, other methods of alignment and wafer bonding may be used. FIG. 13 depicts the EAMR head 250 after step 212 is performed. Thus, the first substrate 252 has been bonded to the second substrate 262 such that the transducers 270 and 302 as well as the laser 256 are between the substrates 252 and 262. Also shown is layer 258 that may be used in the bonding performed in step 212.

Figure 14:
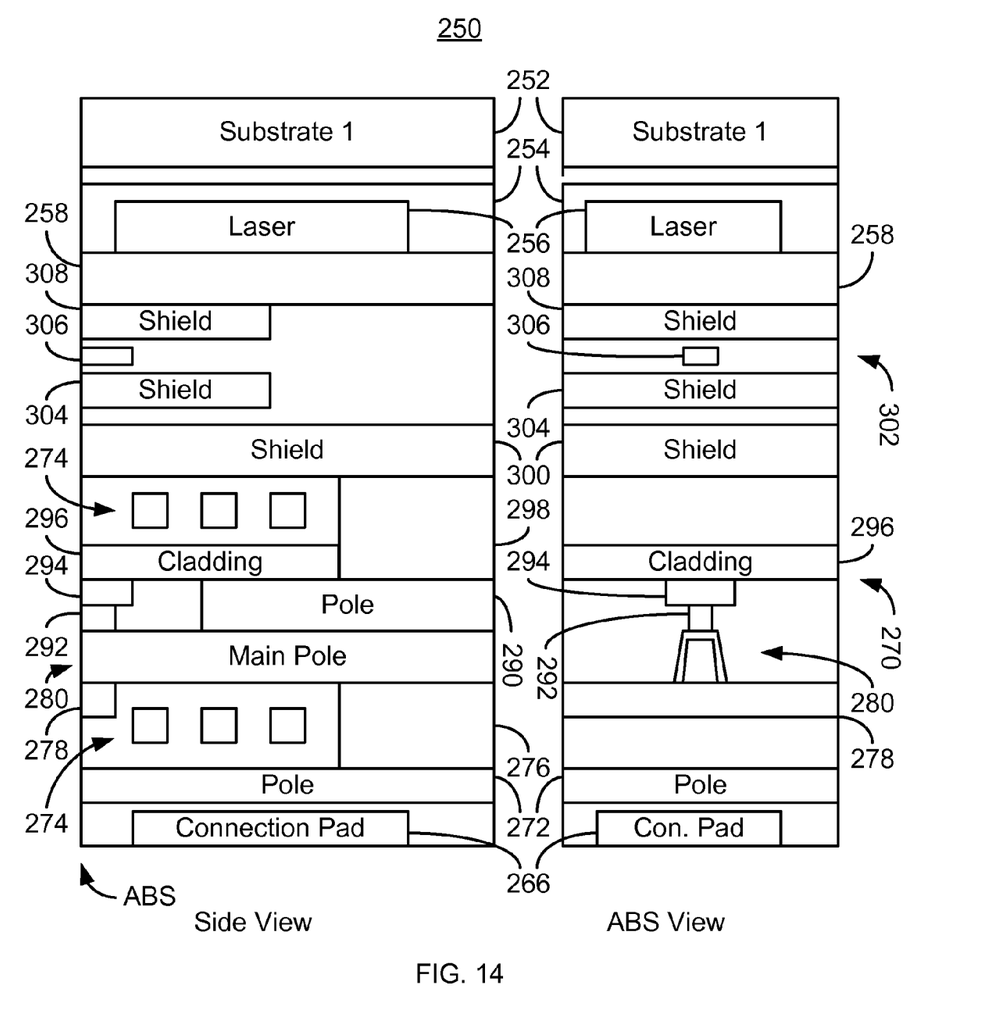
Figure 15:
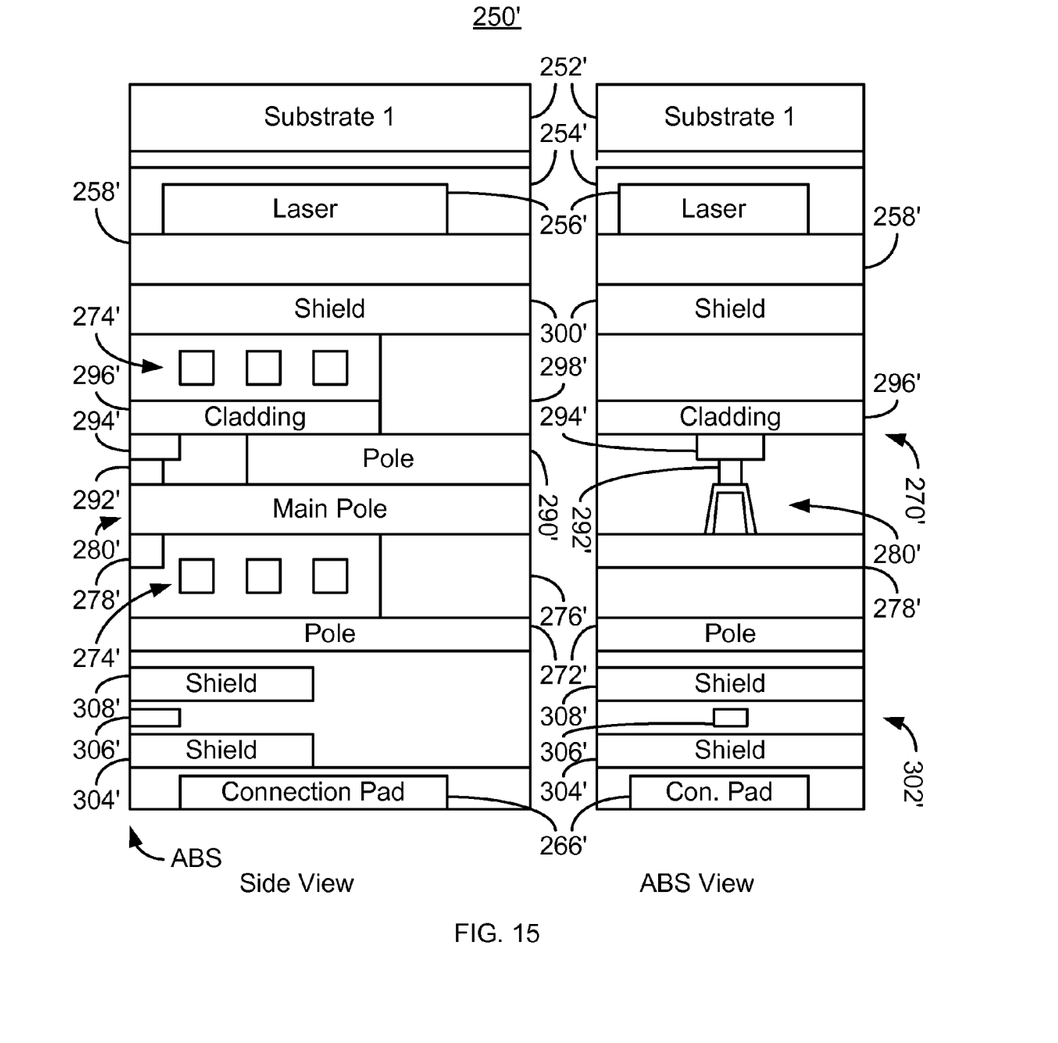
FIG. 15 is a diagram depicting another exemplary embodiment of an EAMR head.

The second substrate 262 is removed, via step 214. Step 214 may include performing an etch or other removal step. The sacrificial layer 264 may be a stop layer for the removal process of step 214. FIG. 14 depicts the EAMR head 250 after step 214 is performed. Thus, the second substrate 262 and sacrificial layer 264 have been removed. In addition, connection pad 266 is exposed. FIGS. 11-14 depicts EAMR heads 250 in which the EAMR transducer 270 is fabricated prior to the read transducer 302. Thus, the EAMR transducer 270 is closer to the second substrate 262 than the read transducer 302. The EAMR transducer 270 is also further from the first substrate 252 than the read transducer 302. FIG. 15 depicts an exemplary embodiment of another of an EAMR head 250'. The components of the EAMR head 250' are analogous to the EAMR head 250. The EAMR head 250' thus includes a first substrate 252', a semiconductor substrate 254', a laser 256', contacts 266', an EAMR transducer 270' and a read transducer 302' analogous to the first substrate 252, semiconductor substrate 254, laser 256, contacts 266, EAMR transducer 270 and read transducer 302, respectively. Similarly, the EAMR transducer 270 includes poles 272' and 290', coil(s) 274', back gaps 276' and 298', optional soft magnetic layer 278', main pole 280', NFT 292', cladding 296' which may be part of a waveguide (not shown in its entirety), and shield 300' that are analogous to poles 272 and 290, coil(s) 274, back gaps 276 and 298, optional soft magnetic layer 278, main pole 280, NFT 292, cladding 296, and shield 300, respectively. Similarly, the read transducer 302' includes shields 304' and 308' and read sensor 306' that are analogous to shields 304 and 308 and read sensor 306. Because the EAMR head 250' is shown after removal of the second substrate, none is shown in FIG. 15. The EAMR head 250' is formed in an embodiment of the method 200 in which the step 210 is performed before step 208. The read transducer 302' is formed prior to the EAMR transducer 270'. Consequently, the read transducer 302' is further from the first substrate 252' than the EAMR transducer 270'.

The EAMR head 250 or 250' is one of a number on the substrate 252. Thus, the first substrate 252 is separated into the individual EAMR heads 250/250', via step 216. Thus, the first substrate may be diced, cleaved, or otherwise cut in an appropriate manner. The substrate is diced or otherwise cut such that the components fabricated in step 202 through 212 remain with the corresponding EAMR head. Fabrication of the EAMR heads/disk drives may then be completed. For example, the heads may be lapped and mounted in a disk drive.

Using the method 200, EAMR heads 250 may be fabricated. The method 200 and EAMR head 250/250' share the benefits of the method 100 and EAMR head 150. Thus, the first substrate 252/252' may be used as the substrate/slider for the head 250/250'. As a result, the first substrate 252/252' may be used to provide an improved heat sink the laser 256/256'. Heat generated by the laser 256/256' may be better dissipated. This improvement in heat dissipation may be provided without introducing additional magnetic structures. Further, use of the high thermal conductivity and/or low optical absorption liner 282/282' may improve the heat dissipation of the EAMR transducers 270/270'. For example, the heat dissipation for the NFT 292/292' and main pole 280/280' may be improved. In addition, providing the EAMR transducers 270 before read transducer 302 allows processes which would otherwise adversely affect the performance of the read transducer 302 to be used in fabricating the EAMR transducer 270. For example, higher temperature processes, which may otherwise destroy the read sensor 306, may be used in fabricating the NFT 292. In addition, the main pole 280/280' may be made thinner in the track width direction. For example, the main pole 280/280' may have a width of not more than one hundred nanometers in the track width direction. In other embodiments, the main pole 280/280' may have a width of not more than seventy nanometers. In some such embodiments, the width of the main pole 280/280' may be not more than fifty nanometers. The top of the main pole 280/280' proximate to the NFT 292/292' may also be made thinner in the track width direction than the bottom of the main pole 280/280' that is distal from the NFT 292/292'. The thin pole 280/280' may be fabricated without damaging the NFT. This is possible because the main pole 280/280' may be milled without damaging the NFT 292/292' because the NFT 292/292' is fabricated after the main pole 280/280'. A narrower pole may also improve the efficiency of the EAMR transducer 270/270'. The NFT 292/292' may serve as a mask for the main pole 280/280' during milling of the NFT 292/292', for example when the shape of the NFT 292/292' is defined. Thus, the portion of the pole closest to the NFT 292/292' is protected by the NFT 292/292' during formation of the NFT 292/292'. Thus, fabrication and performance of the EAMR heads 250/250' may be facilitated. Consequently, manufacturability and performance of the EAMR heads 250/250' may be improved.

We claim:

1. A method for providing a plurality of energy assisted magnetic recording (EAMR) heads comprising:
    bonding a plurality of lasers to a first substrate, the plurality of lasers corresponding to the plurality of EAMR heads and for providing energy to a plurality of EAMR transducers;
    fabricating the plurality of EAMR transducers for the plurality of EAMR heads on a second substrate;
    bonding the first substrate to the second substrate such that the plurality of EAMR transducers and the plurality of lasers reside between the first substrate and the second substrate;
    removing at least one of the first substrate and the second substrate; and
    separating a remaining substrate into the plurality of EAMR heads.

2. The method of claim 1 wherein the step of removing the at least one of the first substrate and the second substrate includes:
    removing only the second substrate.

3. The method of claim 1 wherein the plurality of lasers reside on a laser substrate and wherein the step of bonding the plurality of lasers further includes:
    wafer bonding the laser substrate to the first substrate; and
    thinning the laser substrate.

4. The method of claim 1 wherein the step of fabricating the plurality of EAMR transducers further includes:
    fabricating a plurality of read transducers corresponding to the plurality of EAMR heads, the plurality of read transducers residing between the plurality of EAMR transducers and the second substrate.

5. The method of claim 1 wherein the step of fabricating the plurality of EAMR transducers further includes:
    fabricating a plurality of read transducers corresponding to the plurality of EAMR heads, the plurality of EAMR transducers residing between the plurality of read transducers and the second substrate.

6. The method of claim 1 wherein the step of fabricating the plurality of EAMR transducers further includes:
    fabricating a main pole for each of the plurality of EAMR transducers;
    fabricating a near-field transducer (NFT) for each of the plurality of EAMR transducers, the NFT for focusing the energy onto a media; and
    fabricating a waveguide for each of the plurality of EAMR transducers, the waveguide directing the energy from at least one laser of the plurality of lasers to the NFT.

7. The method of claim 6 wherein the main pole has a plurality of sides and a pole thermal conductivity and wherein the step of fabricating the plurality of EAMR transducers further includes:
    providing a liner on at least the plurality of sides, the liner having liner thermal conductivity greater than the pole thermal conductivity.

8. The method of claim 7 wherein the liner includes at least one of Cu, Ag, and Au.

9. The method of claim 8 further comprising:
    providing a soft magnetic layer between the main pole and the second substrate.

10. The method of claim 6 wherein the main pole resides between the NFT and the second substrate.

11. The method of claim 10 wherein the NFT adjoins the main pole.

12. The method of claim 10 further comprising:
    providing a layer between the NFT and the main pole.

13. The method of claim 1 further comprising:
    providing a sacrificial layer between the second substrate and the plurality of EAMR transducers, the sacrificial layer being a stop layer for a reactive ion etch of the second substrate.

14. A method for providing a plurality of energy assisted magnetic recording (EAMR) heads comprising:
    wafer bonding a semiconductor substrate including a plurality of lasers to a first substrate, the plurality of lasers corresponding to the plurality of EAMR heads and for providing energy to a plurality of EAMR transducers;
    thinning the semiconductor substrate;
    providing a sacrificial layer on a second substrate;
    fabricating the plurality of EAMR transducers and a plurality of read transducers for the plurality of EAMR heads on the second substrate, the sacrificial layer residing between the second substrate and the plurality of EAMR transducers, the plurality of EAMR transducers residing between the plurality of read transducers and the second substrate, each of the plurality of EAMR transducers including a main pole, a liner, and a near-field transducer (NFT), the main pole having a top, a plurality of sides and a pole thermal conductivity, the NFT for focusing the energy onto a media, the main pole residing between the NFT and the second substrate, the liner adjoining the plurality of sides of the main pole and having a liner thermal conductivity greater than the pole thermal conductivity;
    bonding the first substrate to the second substrate such that the plurality of EAMR transducers and the plurality of lasers reside between the first substrate and the second substrate;
    removing the second substrate; and
    separating the first substrate into the plurality of EAMR heads.

15. The method of claim 14 wherein the NFT adjoins the top of the main pole.

* * * * *